Figures 1, 2:
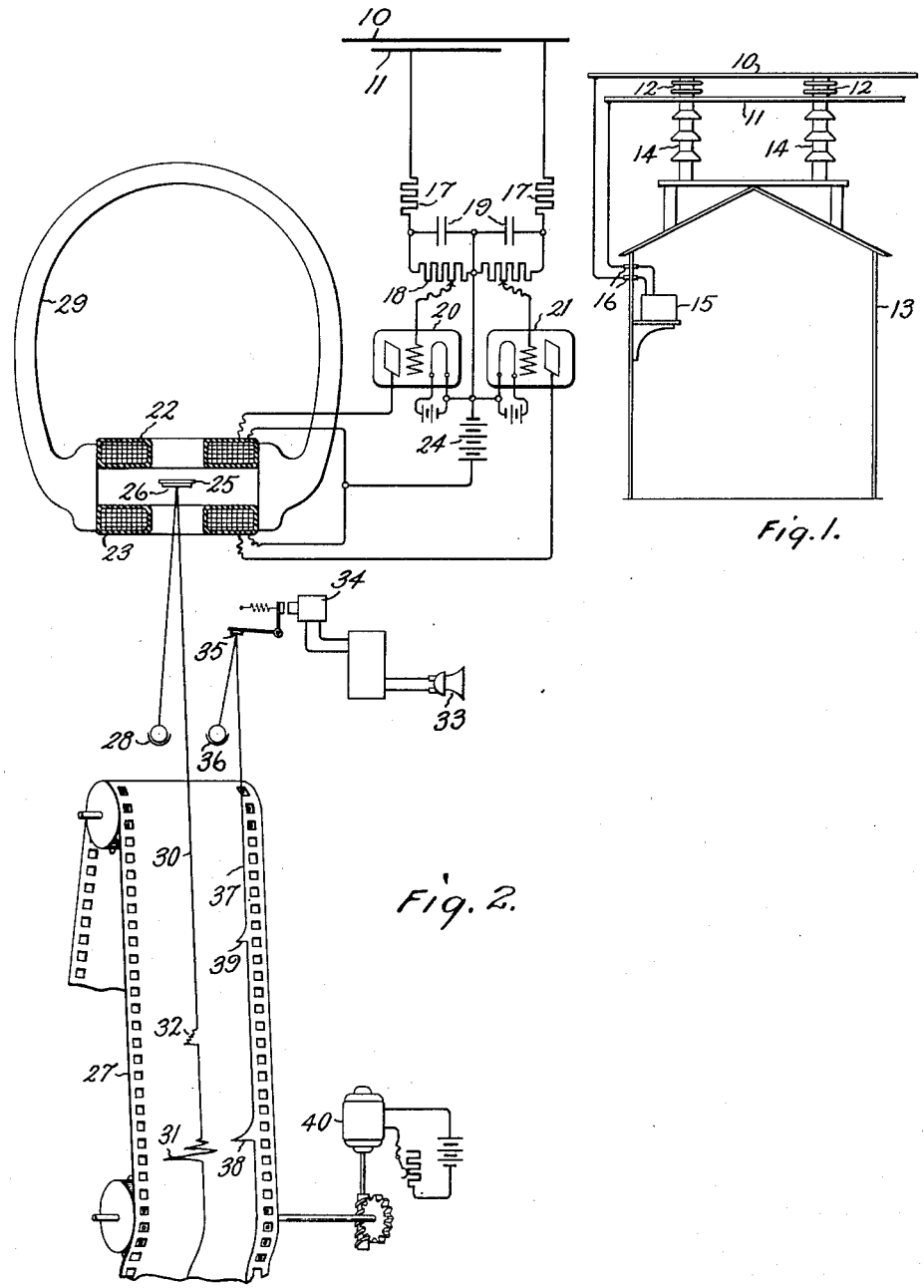

Inventor:
Franklin G. Patterson,
by *Charles E. Tullar*
His Attorney.

Patented Jan. 3, 1933

1,893,337

UNITED STATES PATENT OFFICE

FRANKLIN G. PATTERSON, OF SCHENECTADY, NEW YORK, ASSIGNOR TO GENERAL ELECTRIC COMPANY, A CORPORATION OF NEW YORK

LIGHTNING FIELD INTENSITY RECORDER

Application filed December 28, 1929. Serial No. 417,205.

My invention relates to apparatus for measuring and recording the intensity of electrostatic fields which cause the phenomenon of lightning.

Lightning is believed to cause a considerable amount of trouble in connection with the maintenance and operation of large electric distribution systems, particularly high voltage systems where the insulation requirements are generally such as to withstand surges superimposed upon the system by a lightning stroke. Lightning arresters are employed in connection with such lines to provide a path for the lightning to pass from transmission line to ground and thus reduce the strain upon the line insulation. Apparatus has been employed to obtain approximate measurements of the surges caused on transmission lines by lightning strokes. In spite of all the precautions and studies heretofore undertaken, lightning troubles, or at least, troubles which are attributed to lightning, are still encountered with no clear understanding of the reason why or just what precautions are necessary to obviate the difficulties. Investigators have realized that they have heretofore lacked data as to the intensity of the lightning discharge before it reaches the transmission line and that the lack of this information has seriously impeded the investigation. As an illustration I will cite the example of a transmission system that encountered sixty major interruptions in service, presumably due to lightning during a summer thunderstorm period. Certain changes were then made including the addition of insulators. The next summer season a lesser number of interruptions were encountered, but the system operator and the designer of the apparatus employed on the system were not sure whether the changes made were instrumental in reducing the trouble or whether the lightning was less severe during the latter season. Apparatus built in accordance with my invention has been used experimentally during the past lightning storm season, with results which should eventually materially reduce the factor of uncertainty in such investigations. In accordance with my invention I have provided apparatus for measuring changes in the electrostatic field of the atmosphere upon the occurrence of lightning and thus obtain a measurement of the lightning intensity.

The features of my invention which are believed to be novel and patentable will be pointed out in the claims appended hereto. For a better understanding of my invention reference is made in the following description to the accompanying drawing which illustrates in Fig. 1, a building suitable for supporting and housing the apparatus and Fig. 2 illustrates the connections which I have found to be satisfactory in carrying out my invention.

In general, the apparatus of the invention comprises means for detecting or picking up the electrostatic field upon the occurrence of a lightning stroke, a measuring circuit influenced in accordance with the intensity of the electrostatic field and the necessary recording apparatus for recording the measurement. Since the electrostatic change produced by a lightning discharge varies with the distance away from the point of discharge I also prefer to combine with the above apparatus sound responsive means for determining the duration of time between a lightning record and the resulting thunderclap in order to determine the approximate distance between the point of measurement and the point at which the lightning stroke occurred.

Referring to the drawing Fig. 1, the pickup apparatus consists of two metal plates 10 and 11, preferably aluminum, separated from each other by suitable insulators 12 to form a condenser. In the apparatus which I have employed the lower plate was 68.5×176 centimeters in size and the upper plate slightly larger for rain protection and to obtain symmetry of capacity with respect to earth and the plates were spaced 6 centimeters apart, giving a capacity of .00016 microfarad. The size and spacing of the plates may be varied but such variations will of course change the calibration of the apparatus. This condenser pickup is preferably located on the top of a small wooden building indicated at 13 and suitably insulated from ground and from the building as by insulators 14 equipped with rain shields. The building itself is preferably located in the center of a flat section of ground as far as possible from surrounding obstructions which are likely to cause distortion of the electrostatic field. The measuring and recording apparatus will preferably be located on a shelf within the building as close to the roof as convenient, as indicated at 15 so as to be near the condenser, and will be connected to the condenser plates 10 and 11 by suitable lead wires carried through insulators, as indicated at 16.

To more clearly show the nature of the measuring and recording apparatus that will ordinarily be placed at 15, I have represented in Fig. 2 the preferred form of such apparatus in some detail connected across similar condenser plates 10 and 11. 17 are suitable damping resistances connected in series with the leads from the condenser. The resistance 18 and the condensers 19 are connected in parallel circuits across the leads from the pick-up condenser 10—11 and constitute what may be termed a capacity potential divided by means of which measurement voltages corresponding to sudden changes in lightning field intensity become available across the two halves of resistance 18. In the apparatus which I have used I have found the following resistance and capacitance values to give a satisfactory combination. The capacity of the pick-up condenser about .00016 microfarad, the capacity of the condensers 19 about 1 microfarad each, the damping resistances 17 about 175 ohms each, and the resistance 18 about 500,000 ohms. The middle point of the resistance 18 is connected between the two condensers 19 and the measurement voltage available between this midpoint and suitable points of the resistance in either side are used to control the grid bias of a pair of vacuum tubes 20 and 21, the output or plate circuits of which are connected to the two coils 22 and 23 of a differentially connected electric measuring instrument. A battery 24 supplies the vacuum tube instrument circuits. One end of the battery is connected to the filaments of the two tubes and to the midpoint of resistance 18 so as to normally establish a similar grid bias on each tube from battery 24 and so that the measurement voltages of the resistance is impressed between the filaments and grids of the two tubes but in a reverse relation. This changes the conditions such that as the negative bias of one tube increases the positive bias of the other tube increases, and vice versa. This arrangement will therefore measure both the intensity and the direction of sudden electrostatic field changes of the pick-up condenser. Moreover, the deflection of the galvanometer is independent of variations in the voltage of source 24 over a considerable range.

The movable element of the measuring instrument comprises an iron vane 25 suitably suspended or pivoted at its center so as to rotate about an axis perpendicular to the plane of the drawing. The moving element carries a mirror 26 which permits its movements to be photographically recorded on a moving film 27 by a suitable optical recording system the light source for which is indicated at 28. The instrument is provided with a permanent magnet 29 which normally holds the vane 25 in the position shown. Current from tube 20, flowing through coil 22, and current from tube 21, flowing through coil 23, produce a cross field tending to turn the iron vane in one or the other direction, depending on the direction of the change in field intensity furnishing the grid bias of the tubes.

The operation of the measurement circuit will be better understood by tracing the sequence of events as a thunderstorm field builds up and then breaks down upon the occurrence of a lightning stroke. Assume the pick-up plates 10 and 11 to be exposed to the electrostatic field of an oncoming cloud. Due to the flat terrain surrounding the location, the field may be regarded as substantially normal to the plane of the plates and is of a polarity dependent on the sign of the cloud charge. As the field builds up, a separation of charge takes place through resistance 18 such that the two plates 10 and 11 are at nearly zero potential with respect to each other and retain bound charges consistent with the potential gradient of the field and changing with it. The time constant of the circuit through the capacity potential divider is adjusted to such value, approximately one-quarter of a second, that the charges readily follow ordinary building up rates. Under these conditions the small equalizing current flowing through the resistance 18 is insufficient to produce any operating bias on the vacuum tubes and the instrument traces a zero record line 30. Suppose now that a lightning stroke takes place in such a way as to partially or completely destroy the field. The bound charges on plates 10 and 11 are suddenly released and the plates tend to assume the corresponding potential of space before breakdown. The resulting voltage difference created by the sudden change in field intensity must be delayed or preserved a sufficient length of time for the recording instrument to get into action and produce a record. Due to the insertion of the capacity potential divider a small but known fraction of this voltage becomes available at the vacuum tube terminals and due to the fact that the time constant of the capacity potential divider circuit is much longer than the probable duration of a lightning stroke, the condensers 19 are charged to a potential dependent on the change in field intensity and then discharge exponentially through resistance 18. The discharge is of sufficient duration to enable the galvanometer to follow it, thus giving the record on the film 27. The tubes are adjusted to cause current to flow in coils 22 and 23 in opposite directions simultaneously, the resulting deflection of the mirror 26 being proportional to the change in field intensity and in a direction dependent upon the direction of such change.

Lightning strokes are likely to be of either polarity and consequently I prefer to have the zero line 30 of the film about in the center, thereby allowing maximum deflection in either direction. The leakage resistance in the circuit of pick-up condensers is low enough so that slow changes in atmospheric potential do not cause a deflection of the galvanometer and thus the zero line is normally maintained at the center of the film. If but one tube and galvanometer coil were used a change in voltage of battery 24 would cause a drift of the zero line because of a corresponding change in the plate current of the amplifier tube. If, however, two tubes are differentially connected with the galvanometer, as represented in the drawing, changes in battery voltage and plate current will cause no deflection if the tubes have similar characteristics. Such an arrangement is of course applicable to recording galvanometers generally.

Typical lightning stroke records are indicated at 31 and 32. From appearance the stroke causing record 31 appears to be about twice as severe as the stroke causing record 32 but this is not necessarily the case since the intensity of field change at the recording apparatus depends to a large extent upon the distance which the instrument is from the location where the lightning actually struck or where the main field broke down. Thus, in order to properly evaluate the records it is necessary to know the distance to the stroke which produced the record. I obtain this distance data by noting the time between the occurrence of the record and the resulting thunderclap and then computing the distance from the known speed of travel of sound. Preferably the sound records are recorded on the same film since in this way we may obtain a true graphic picture of the entire phenomenon. For this purpose I have represented at 33 a suitable microphone connected through the necessary amplifying circuit to another galvanometer 34 which influences a mirror 35 cooperating with an optical system having a light source 36 to produce a sound record on the film. The zero line of the sound record is indicated at 37. 38 and 39 respectively indicate the thunderclap records for lightning strokes the records of which are shown at 31 and 32. If records 31 and 38 had occurred simultaneously the records would be directly in line crosswise of the film due to the co-ordination of the two records. It is at once apparent that the stroke causing records 32 and 39 was much farther from the recording instrument than the stroke causing records 31 and 38. If now the speed of the film is timed for example 5 inches per minute by a suitable driving motor represented at 40 and knowing that sound travels approximately a mile in 5 seconds, we know that one inch of film represents 2.4 miles distance. Thus, if records 32 and 39 are spaced apart a distance of ½ inch on the film in a linear direction we know that the lightning stroke causing record 32 was about 1.2 miles distance from the recorder.

The recorder is first calibrated with an artificial field of known intensity. Its range of operation is satisfactory up to a distance of about 10 miles. To properly study the lightning effects along a transmission line it is recommended that such recorders be installed about every 15 miles. Records of the same lightning stroke may then be obtained on recorders located at different points and by comparison of different records the location of the lightning stroke as well as its intensity may be determined with a fair degree of approximation. Such recorders may be used to determine the most suitable route for a contemplated transmission line, or the most suitable location of a future powder factory for example, by investigations conducted over a period of years to determine the routes or areas least subject to lightning disturbances.

In accordance with the provisions of the patent statutes I have described the principle of operation of my invention, together with the apparatus which I now consider to represent the best embodiment thereof, but I desire to have it understood that the apparatus shown and described is only illustrative and that the invention may be carried out by other means.

What I claim as new and desire to secure by Letters Patent of the United States, is:

1. Apparatus for investigating the intensity of lightning discharges comprising means for determining changes in the lightning intensity field of the atmosphere at a given location upon the occurrence of a lightning stroke at another location, together with means for determining the approximate distance between such locations.

2. Apparatus for investigating the intensity of lightning discharges comprising means for measuring and recording changes in the lightning intensity field of the atmosphere at a given location upon the occurrence of a lightning stroke at another location, together with means for determining the approximate distance between such locations.

3. Apparatus for investigating the intensity of lightning discharges comprising means for measuring changes in the lightning intensity field of the atmosphere at a given location upon the occurrence of a lightning discharge at another location, means at the first mentioned location responsive to the sound of the thunderclap resulting from such lightning discharge, a recording film, means for moving said film at a predetermined rate, and means responsive to said measuring and sound responsive means for producing corresponding time coordinated records on said film.

4. Apparatus for investigating the intensity of lightning discharge comprising means for measuring the change in the lightning intensity field at a given location upon the occurrence of a lightning discharge at another location, a photographic recording film on which said measurement is recorded, sound responsive means for producing a record on said film in response to the thunderclap resulting from said lightning discharge, and means for moving said film so that the distance apart of said records along the film is proportional to the distance between said locations.

5. The method of investigating the intensity of lightning discharge which consists in recording the intensity of lightning field change at a given location produced by a lightning discharge at another location and determining the distance between said locations from the time required for the sound of the resulting thunderclap to travel therebetween.

6. Lightning field intensity recording apparatus comprising a condenser proportioned and positioned to be subject to the lightning field intensity of the atmosphere, a recording galvanometer, and means connected between said condenser and galvanometer for energizing the latter in response to sudden changes in the lightning field intensity to which said condenser may be subjected whereby records proportional to the intensity of lightning discharges may be recorded.

7. Lightning field intensity recording apparatus comprising a pick-up condenser proportioned and positioned to be subject to the lightning field intensity of the atmosphere, a circuit containing resistance connected across said condenser, a second condenser of relatively greater capacity than the pick-up condenser connected in parallel with said resistance, said resistance and second mentioned condenser being proportioned such that a sudden change in the lightning field of the atmosphere surrounding the pick-up condenser will cause a voltage of appreciable duration to appear across the resistance, and a recording instrument responsive to such voltage for producing a record thereof.

8. Apparatus for investigating the intensity of lightning comprising a pick-up condenser positioned and proportioned to be subject to the electrostatic field between earth and clouds, a circuit connected across said condenser including resistance and capacity connected in parallel so proportioned that a sudden change in the field to which said condenser is subjected, such as would be caused by a lightning discharge between the earth and clouds, will cause a voltage of appreciable duration to appear across said resistance, a recording galvanometer, and a vacuum tube having its output circuit connected to said galvanometer and its operation controlled by the voltage across said resistance, said apparatus being calibrated to record the intensity and direction of electrostatic changes to which said condenser is subjected upon the occurrence of lightning discharges.

9. Apparatus for investigating the intensity of lightning discharges comprising a condenser positioned and proportioned to be influenced by the electrostatic field of the atmosphere in a direction normal to the earth surface, a high ohmic resistance connected across said condenser through which equalizing currents are caused to flow due to changes in the electrostatic field to which the condenser is subjected, vacuum tubes controlled in response to an appreciable voltage drop across said resistance, an electrical recording instrument energized through said vacuum tubes in response to such voltage drop, and capacitance means associated with said resistance for prolonging the flow of equalizing currents therethrough upon the occurrence of a sudden change in such electrostatic field for a sufficient length of time for the electrical recording instrument to get into operation and produce a record.

10. Apparatus for investigating the intensity of lightning discharges comprising a pick-up condenser of about .00016 microfarad positioned to be influenced by the electrostatic field between earth and clouds, a circuit connected across said pick-up condenser including a capacity potential divider comprising a resistance of about 500,000 ohms having a condenser of about 1 microfarad connected across each half thereof, damping resistances of about 175 ohms each connected between said capacity potential divider and the pick-up condenser, a pair of vacuum tubes having grids connected to be reversely influenced in proportion to the voltages across the two halves of said first mentioned resistance, and a recording galvanometer having a pair of coils respectively connected in the output circuits of said vacuum tubes, said apparatus being calibrated to record the intensity of lightning discharges which cause sudden changes in the electrostatic field of said pick-up condenser.

11. Apparatus for investigating the intensity of lightning comprising an electrostatic pick-up condenser mounted upon and insulated from a wooden building so as to be influenced by electrostatic fields between earth and clouds in the vicinity of such building, electrical recording apparatus contained within the building and located near the upper portion thereof as near the condenser as convenient, and means electrically connected between said instrument and condenser for energizing said instrument in proportion to the magnitude and in a direction corresponding to sudden changes in the electrostatic field to which said condenser may be subjected upon the occurrence of a lightning discharge.

In witness whereof, I have hereto set my hand this 27th day of December, 1929.

FRANKLIN G. PATTERSON.